United States Patent
Underwood et al.

[11] 3,900,487
[45] Aug. 19, 1975

[54] CERTAIN DIAZATHIABICYCLOHEPTANE DERIVATIVES

[75] Inventors: William George Elphinstone Underwood, Stoke Poges; Alan Gibson Long, Greenford, both of England

[73] Assignee: Glaxo Laboratories Limited, Greenford, England

[22] Filed: July 30, 1971

[21] Appl. No.: 167,874

[30] Foreign Application Priority Data
July 31, 1970 United Kingdom............... 37187/70

[52] U.S. Cl.... 260/306.7 C; 260/239.1; 260/243 C; 260/247.1; 260/250 Q; 260/293.68; 260/294.8 C
[51] Int. Cl............................................. C07d 99/10
[58] Field of Search ........... 260/306.7 CA, 306.7 C, 260/294.8 C

[56] References Cited
UNITED STATES PATENTS

| | | | |
|---|---|---|---|
| 3,422,103 | 1/1969 | Wall et al....................... | 260/243 C |
| 3,522,266 | 7/1970 | Woodward...................... | 260/306.7 |
| 3,681,380 | 8/1972 | Cooper et al.................... | 260/306.7 |
| 3,705,892 | 12/1972 | Cooper........................... | 260/239.1 |
| 3,755,342 | 8/1973 | Heusler et al................... | 260/306.7 C |
| 3,862,164 | 1/1975 | Cooper........................... | 260/306.7 C |

Primary Examiner—Richard J. Gallagher
Attorney, Agent, or Firm—Bacon & Thomas

[57] ABSTRACT

Novel semisynthetic thiazolidine derivatives of formula

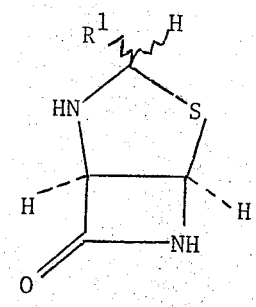

where $R^1$ is the residue of an acyl group $R^1CO$— containing 1–21 carbon atoms are provided by reduction of the corresponding $\Delta^3$-thiazoline, the thiazolidine derivatives being of use in the production of cephalosporins, penicillins and related β-lactam antibiotics. The preparation and use of such thiazolines and thiazolidines in N-protected forms are also described. The $\Delta^3$-thiazoline starting materials may be obtained from penicillins without changing the configuration of the β-lactam structure desired in the final product.

7 Claims, No Drawings

CERTAIN DIAZATHIABICYCLOHEPTANE DERIVATIVES

This invention relates to novel semisynthetic intermediates or relay compounds of use in the production of cephalosporins, penicillins and related β-lactam antibiotic compounds.

The first total synthesis of a cephalosporin antibiotic was achieved by R. B. Woodward (J.A.C.S. 1966, 88, (4), 852) starting from L(+)-cysteine and proceeding via about eight synthetic steps to a β-lactam (i) which was then converted into a cephem (iii) by the following reaction sequence.

R. B. Woodward started from L(+)- cysteine in order to achieve a total synthesis. However, this material is relatively expensive and even more significantly its conversion into a β-lactam of the required stereochemical configuration requires extremely careful control of the stereochemistry at several points. We have now found that intermediates closely similar to Woodward's compound (i) can be produced from penicillins; this conversion proceeds more readily and in fewer stages than the production of (i) from L(+)-cysteine and has the merit of starting from a β-lactam of the required steric configuration. Furthermore, penicillins, particularly penicillins G and V, are generally cheaper to pro-

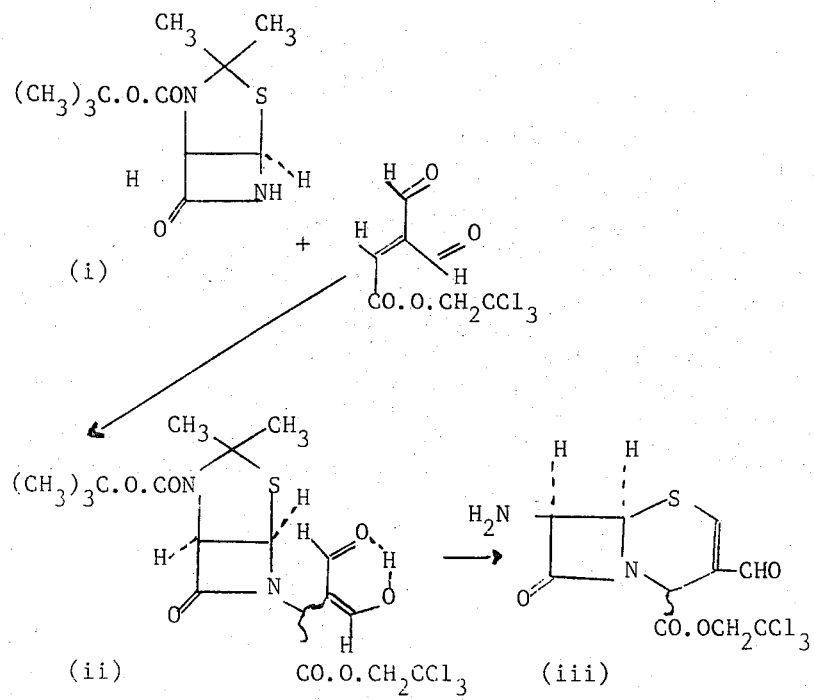

The compound (i) thus constitutes a valuable intermediate in the preparation of cephalosporins and other β-lactam antibiotics; by reaction with an analogous aldehyde reagent it is also possible to convert (i) into a penicillin and it will be appreciated that in this way penicillins having varying substitution in the 5-membered ring can be produced. Similarly by replacing the 2,2,2—trichloroethyl 3,3-diformylacrylate reagent by suitably substituted alternatives, a series of cephalosporin analogues can be prepared.

duce, e.g. by fermentation, than L(+)-cysteine.

The copending applications of Barton, Long, Looker, Wilson and Underwood Ser. No. 167,876, filed Jul. 30, 1971 and Underwood and Hewitt Ser. No. 167,847, filed Jul. 30, 1971 describe the conversion of penicillins into key intermediates or relay compounds of the formula I as shown below. The present invention is concerned with the conversion of these into further key intermediates of the formulae II and III as further shown below:

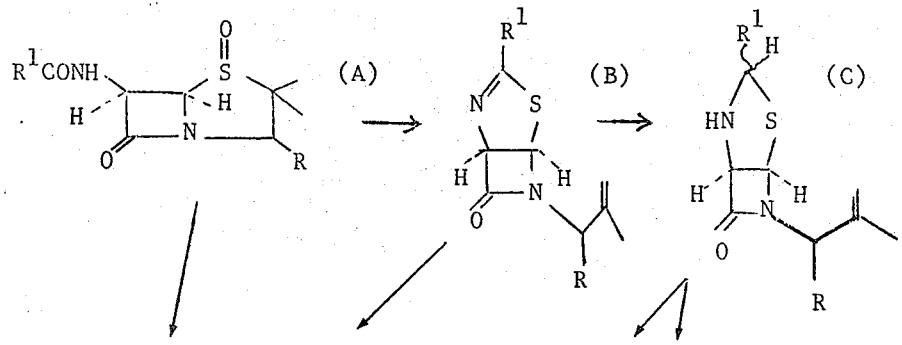

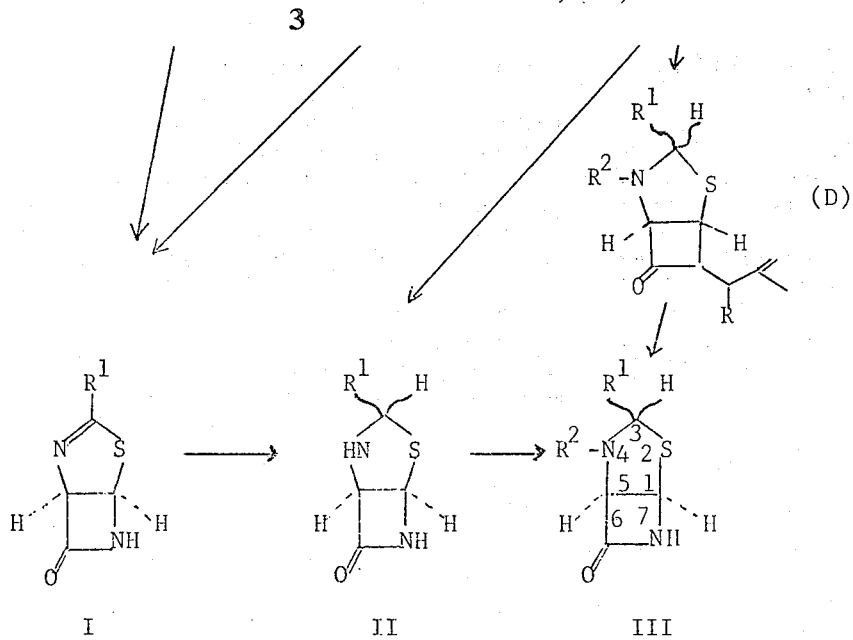

I
II
III

The group R in the penicillin of formula A may be hydroxy or amino, in which case it is possible to form a compound of formula I directly therefrom; R may also be a carboxyl or esterified carboxyl group, or a protected hydroxyl or amino group, in which case compound B is obtained as an intermediate, but the side chain may be removed subsequently by various methods to yield the desired compound of formula I. The substituent $R^1$ in the compounds of formulae I, II and III is derived from the 6-acyl group $R^1CO$— of the penicillin and may generally be defined as the residue of an acyl group having 1-21 carbon atoms. $R^2$ in formula III is a protecting group, that is a group which may be selectively removed under mild acidic or basic conditions, or by nucleophiles such as $I^-$ or by reduction.

The side chain

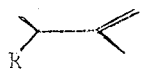

in compounds B,C and D may be readily isomerised with a base to the group

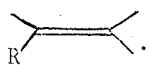

It will be seen that compounds of the formula III are closely analogous to Woodward's compound (i) and since the groupings at the 3- and 4-positions are eliminated in the Woodward conversion of (i) to (iii), exactly the same compounds may be prepared by condensation of either compound (i) or compound (iii) with 3,3-diformylacrylate and related compounds.

The compounds of formula (iii) can readily be converted into active antibiotic substances. The primary amino group can be acylated with a very wide range of reagents to introduce one of the many acyl side chains of the penicillin and cephalosporin antibiotics. The acylation may, for example, be effected using an acyl halide e.g. an acyl chloride, for example phenylacetyl chloride. (Such reactions are described in British Patent No. 966221). Since a free carboxyl group is desirable for antibiotic activity, the esterified carboxyl group will preferably be cleaved. The trichloroethyl group in compounds of formula (iii) is chosen for its ease of selective removal which may be effected by reduction with zinc and acetic acid. The resulting cephems having a 3-formyl group are known to have antibiotic activity. Derivatives thereof, in which the formyl group is reduced to hydroxymethyl or is converted by reactions of the Wittig type to a vinyl group, are also known to possess antibiotic activity.

During such conversions it is desirable to convert $\Delta^2$ compounds into their $\Delta^3$ isomers.

The present invention provides a process for the preparation of compounds of general formula IIA

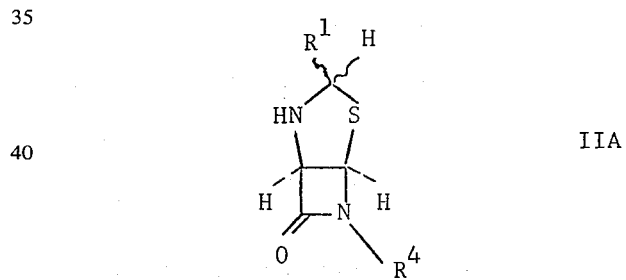

IIA (wherein $R^1$ is the residue of an acyl group $R^1CO$— having 1-21 carbon atoms and $R^4$ is a hydrogen or a group

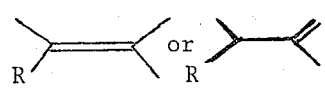

where R is a protected hydroxyl or amino group) which comprises reacting a compound of general formula IA

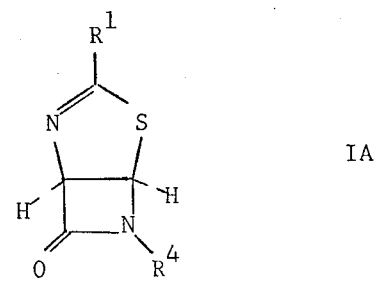

IA with a reducing agent serving to reduce an imino-thioether to an amino-thioether. Suitable reducing agents include the dissolving metal reducing agents, for example zinc in acid, e.g. formic, acetic or propionic acid, aluminium amalgam in the presence of water being a preferred reducing agent. Electrolytic reduction may also be used. Reduction can also be effected by hydrogenation, particularly in the presence of a dissolved metal of group VIII of the periodic table.

Where aluminium amalgam is used, a solvent for the thiazoline which is capable of dissolving water is preferably present, for example an ether such as diethyl ether, dioxan or tetrahydrofuran or a substituted amide solvent such as dimethylformamide or dimethylacetamide. Preferably the water is slowly added during the reaction to maintain a steady evolution of hydrogen. The course of the reaction may be followed by thin layer chromatography.

In general $R^1$ will remain unchanged in the reaction sequence of the invention. If, however, the thiazolidine product is utilized for condensation with e.g. 3,3-diformylacrylate in the manner of the Woodward synthesis set out above, $R^1$ is not retained in the final product, so that changes in $R^1$ during the process of the present invention will not affect the overall synthesis. Thus, for example, where $R^1$ is a phenoxymethyl group, reduction with aluminium amalgam yields a compound in which $R^1$ is a methyl group. The resulting product, however, can be reacted in the same manner as the phenylmethyl compound.

$R^1$ can be defined more specifically as hydrogen (which is the residue of the formyl group) or an organic group which contains 1-20 carbon atoms, and may carry a wide range of substituents. In general, the following main classes are especially suitable for the acyl group $R^1CO$ from which $R^1$ derives:

i. $R^u C_n H_{2n}$—CO where $R^u$ is aryl (carbocyclic or heterocyclic), cycloalkyl, substituted aryl, substituted cycloalkyl, cyclohexadienyl or a non-aromatic or mesoionic heterocyclic group, and n is an integer from 1-4. Examples of this group include phenylacetyl; substituted phenylacetyl, e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis(2-chloroethyl) aminophenylpropionyl; thienyl-2 and -3-actyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g. phenyl or halophenyl e.g. chloro- or bromo- phenyl. An acyl group of this type is 3-o-chlorophenyl-5-methyl isoxazol-4-yl-acetyl.

ii. $C_n H_{2n+1}$CO- where n is an integer from 1-7, including straight or branched groups, which may carry substituents and/or be interrupted by an oxygen or sulphur atom or substituted by e.g. a cyano group, a carboxy group, an alkoxycarbonyl group, a halogen atom, a hydroxy group or a carboxycarbonyl group (—CO.-COOH). Examples of such groups include cyanoacetyl, hexanoyl, heptanoyl, octanoyl, chloroacetyl, trichloroacetyl and butylthioacetyl.

iii. $C_n H_{2n-1}$CO- where n is an integer from 2-7, including straight or branched groups which may be interrupted by an oxygen or sulphur atom. An example of such a group is allylthioacetyl.

iv.

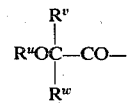

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, 2-phenoxypropionyl, 2-phenoxybutyryl, 2-methyl-2-phenoxypropionyl, p-cresoxyacetyl and p-methylthiophenoxyacetyl.

v.

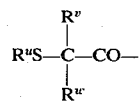

where $R^u$ has the meaning defined under (i) and, in addition, may be benzyl and $R^v$ and $R^w$ have the meanings defined under (iv). Examples of such groups include S-phenylthioacetyl, S-chlorophenylthioacetyl, S-fluorophenylthioacetyl, pyridylthioacetyl, and S-benzylthioacetyl.

vi. $R^u Z(CH_2)_m CO$- where $R^u$ has the meaning defined under (i) and, in addition, may be benzyl, Z is an oxygen or sulphur atom and m is an integer from 2-5. An example of such a group is S-benzylthiopropionyl.

vii. $R^u CO$- where $R^u$ has the meaning defined under (i). Examples of such groups include benzoyl, substituted benzoyl (e.g. aminobenzoyl), 4-isoxazolyl- and substituted 4-isoxazolylcarbonyl cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3-carboxy-2-quinoxalinylcarbonyl). Other possible substituents for benzoyl include alkyl, alkoxy, phenyl, phenyl substituted by carboxy, alkylamido, cycloalkylamido, allylamino, phenyl(lower)alkylamido, morpholinocarbonyl, pyrrolidinocarbonyl, piperidinocarbonyl, tetrahydropyridino, furfurylamido or N-alkyl-N-anilino, or derivates thereof, and such substituents may be in the 2- or 2- and 6- positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methyl-isoxazol-4-yl carbonyl, 3-o-chlorophenyl-5-methyl isoxazol-4-yl carbonyl and 3-(2,6-dichlorophenyl)-5-methyl-isoxazol-4-yl carbonyl.

viii.

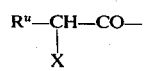

where $R^u$ has the meaning defined under (i) and X is an amino, substituted amino (e.g. acylamido or a group obtained by reacting the α-aminoacylamido group of the 6-side chain with an aldehyde or ketone e.g. acetone, methylethylketone or ethyl acetoacetate), hydroxy, carboxy, esterified carboxy, triazolyl, tetrazolyl, cyano, halogeno, acyloxy (e.g. formyloxy or lower alkanoyloxy) or etherified hydroxy group. Examples of such acyl groups are α-aminophenylacetyl and α-carboxyphenylacetyl.

ix.

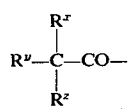

where $R^x$, $R^y$ and $R^z$ which may be the same or different may each represent lower alkyl, phenyl or substituted phenyl and $R^x$ may also be hydrogen. An example of such an acyl group is triphenylmethylcarbonyl.

x.

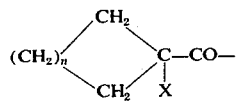

where X has the meaning defined under (viii) above and n is an integer of from 1 to 4. An example of such an acyl group is 1-aminocyclohexanecarbonyl.

xi. Amino acyl, for example $R^w CH(NH_2) \cdot (CH_2)_n CO$ where n is an integer from 1-10, or $NH_2 \cdot C_n H_{2n} Ar(CH_2)_m CO$, where m is zero or an integer from 1-10, and n is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British Patent Specification No. 1,054, 806. A group of this type is the p-aminophenylacetyl group. Other acyl groups of this type include those, e.g. δ-aminoadipoyl, derived from naturally occurring amino acids and derivatives thereof e.g. N-benzoyl-δ-aminoadipoyl or N-chloroacetyl-δ-aminoadipoyl.

xii. Substituted glyoxylyl groups of the formula $R^y \cdot CO.CO-$ where $R^y$ is a substituted or unsubstituted aliphatic, araliphatic or aromatic group, e.g. a thienyl group, a phenyl group, or a mono-, di- or tri- substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups, formed for example with hydroxylamine, semicarbazide, thiosemicarbazide, isoniazide or hydrazine.

Where $R^4$ in formulae IA and IIA represents a group

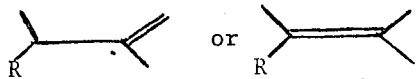

in which R is a protected hydroxyl or amino group, the chain $R^4$ may be removed subsequently to permit further functionalisation of the β-lactam nitrogen, for example as in the conversion (i)⟶(ii) of Woodward shown above. By the term "protected hydroxyl or amino groups" as used herein we mean groups which can be readily cleaved to yield hydroxyl or amino groups without unwanted degradation of other parts of the molecule, for example by mild acidic or basic hydrolysis, enzymic hydrolysis or hydrogenolysis. Suitable protected hydroxyl groups include, for example, readily cleaved ether and ester groups such as the tetrahydropyranylox or 4-methoxy-tetrahydropyranyloxy and di-(2-chloroethoxy)-methoxy groups which may be removed by mild acid hydrolysis; and the diphenylmethoxy groups which may readily be removed by hydrogenolysis; and the carbobenzoxy and trifluoracetoxy groups which can readily be removed by hydrolysis. In some of these cases, e.g. with the tetrahydropyranyloxy group, a further asymmetric centre may be introduced. However, the 4-methoxy-tetrahydropyranyloxy group avoids introduction of such an asymmetric centre.

Suitable protected amino groups include, in particular, urethane groups i.e. esterified carboxylamino groups. As indicated above, urethanes may be prepared from the corresponding 3-isocyanates and represent key intermediates in preparing the free amino compounds and other protected derivatives thereof such as acylates. The esterifying grouping in the urethanes may, for example, be any alcohol residue which can readily be cleaved from the urethane, for example by mild acidic or basic hydrolysis, enzymic hydrolysis, reduction or hydrogenolysis. Such groupings include, for example, 2-halo-lower alkyl groups, preferably carrying more than one halogen atom, for example a 2,2,2-trichloroethyl or 2,2,2-trichloro-1-methyl-ethyl group or a 2,2,2-tribromoethyl group; or a 2-bromoethyl or 2-iodoethyl group. In general, the halogen atoms are preferably chlorine. These haloalkoxy groups can readily be removed by treatment with a chemical reducing agent under mild conditions, generally at room temperature or with cooling. Such agents are primarily nascent hydrogen as obtained, for example, by the reaction of a metal, metal alloy or metal amalgam upon a hydrogen donor; there may be used, for example, zinc, a zinc alloy, for example zinc copper, or zinc amalgam, in the presence of an acid such as organic carboxylic acid, for example a lower alkane-carboxylic acid such as formic or more preferably acetic acid, or an alcohol, such as a lower alkanol, for example methanol or ethanol, or an alkali metal amalgam, such as sodium or potassium amalgam, or aluminium amalgam in the presence of a solvent containing water, such as ether or a lower alkanol. Zinc may also be used in aprotic solvents such as pyridine and dimethylformamide. It converts the haloester into a complex zinc salt of the corresponding acid. The acid may then be generated by the action of protic solvents, such as water, preferably in acidic conditions. A halo alkoxy group may likewise be cleaved by treatment with a metal salt having a high redox potential, such as a compound of divalent chromium, for example chromous chloride or acetate, preferably in an aqueous medium containing a water-miscible organic solvent such as a lower alkanol, a lower alkanecarboxylic acid or an ester, for example methanol, ethanol, acetic acid tetrahydrofuran, dioxan, ethyleneglycol dimethyl ether or diethyleneglycol dimethyl ether. The group R may also be an arylmethylamino group, in which case removal may be effected by hydrogenolysis, e.g. using a platinum or palladium catalyst.

The invention further provides a process in which a compound of formula II obtained as defined above, is converted into an N-protected derivative of formula IIIA

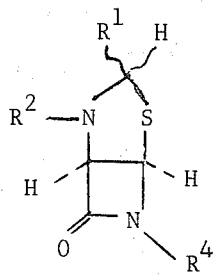

IIIA wherein R² is a selectively removable group serving to protect a secondary nitrogen atom and R⁴ has the above meaning, by reaction of the compound of formula IIA with a reagent capable of introducing the protecting group R².

The N-protected compounds of formula IIIA thus prepared are of use in the condensation with e.g. 3,3-diformylacrylate, as in the Woodward synthesis, since attack at the thiazolidine nitrogen is prevented. Suitable protecting groups R² include hydrocarbyloxycarbonyl groups (wherein the protected amino group is a urethane), arylmethyl groups and sulphenyl groups. Hydrocarbyloxycarbonyl groups include, in particular alkoxycarbonyl groups such as methoxycarbonyl, ethoxycarbonyl, and most preferably, t-butoxycarbonyl groups, which may carry substituents such as halogen atoms as in the 2,2,2-trichloroethoxycarbonyl group, as well as aralkoxycarbonyl groups such as benzyloxycarbonyl, p-methoxybenzyloxycarbonyl and diphenylmethoxycarbonyl groups. Cycloalkoxycarbonyl groups are also advantageous, especially the adamantyloxycarbonyl group. The p-nitrobenzyloxycarbonyl group, which can be selectively removed by reduction e.g. hydrogenolysis, is also useful. Sulphenyl groups include o- and p-nitrophenylsulphenyl groups. Arylmethyl groups include, for example, diphenylmethyl and triphenylmethyl groups.

This introduction of a protecting group at the thiazolidine nitrogen atom can be carried out in a number of ways. Normally, acid halides are preferred reagents for introducing acyl groups but N-acylation of thiazolidines in this manner is generally difficult. In order to produce urethanes of the type exemplified by Woodward's compound (i), it is preferred to react the thiazolidine of formula II with a carbonyl dihalide such as phosgene and to react the resulting carbamoyl halide with an alcohol or phenol or a derivative thereof to produce the urethane. The phosgene is preferably reacted in the presence of a base, e.g. a tertiary nitrogen base such as trimethylamine, triethylamine, pyridine or collidine or an inorganic base such as an alkali metal bicarbonate. The reaction is preferably effected in an inert polar solvent such as a cyclic ether, e.g. dioxan or tetrahydrofuran, a substituted amide such as dimethylformamide or dimethylacetamide or a nitrile solvent such as acetonitrile.

The reaction of the carbamoyl halide with the alcohol or phenol is preferably effected in the presence of an acid acceptor e.g. a tertiary organic base such as triethylamine, trimethylamine, pyridine or collidine or an inorganic base such as an alkali metal bicarbonate or, most preferably an alkaline earth metal carbonate such as calcium carbonate.

Alternatively, hydrocarbyloxycarbonyl protecting groups can be inserted directly by reaction of the compound of formula II with, for example, an appropriate ester of a haloformic acid, more preferably a chloroformic or fluoroformic ester. Thus reaction with fluoroformic acid t-butyl ester serves to introduce a —COOC(CH₃)₃ group, while a —COOCH₂CCl₃ group can be introduced by reaction with chloroformic acid 2,2,2-trichloroethyl ester. Similarly reaction with chloroformic acid benzyl ester will introduce a —COOCH₂.C₆H₅ group.

The N-protected compounds may be used directly in a Woodward-type condensation with, for example, 3,3-diformylacrylates and similar reagents. Compounds of formula IIA may also be condensed with such reagents without attack at the thiazolidine nitrogen, particularly if the latter is protonated. Thus the acid addition salts of the compounds of formula IIA with, for example, mineral acids such as hydrochloric, sulphuric or phosphoric acid or with organic acids such as p-toluene sulphonic acid or trifluoroacetic acid also constitute valuable synthetic intermediates. In strong acids, the β-lactam nitrogen may also be protonated. The acid addition salts of the compounds of formula II are also of use in separating the parent bases from mixtures thereof by, for example, fractional crystallisation.

The compounds of formula II and their acid addition salts, their 4-halocarbonyl derivatives and the compounds of formula IIIA are in themselves novel compounds with useful synthetic applications as described above, and constitute a further feature of the present invention.

The following Examples serve to illustrate the invention but should not be regarded as limiting it in any way:

EXAMPLE 1

3-Benzyl-4,7-diaza-6-oxo-2-thia-1(R), 5(R)-bicyclo[3,2,0]-heptane

A solution of 3-benzyl-4,7-diaza-6-oxo-2-thia-1(R), 5(R)-bicyclo[3,2,0]-hept-3-ene (1 g., 4.55 mmole) in tetrahydrofuran (50 ml.) and water (0.5 ml.) containing amalgamated aluminium (from 3.5 g. aluminium) (Fieser and Fieser, "Reagents for Organic Synthesis," Wiley, New York, 1967, p, 20) was stirred at about 20°. At 30-minute intervals, further quantities of water (0.5 ml.) were added. The reaction was monitored by t.l.c. (Merck F₂₅₄ silica gel in benzene:ethyl acetate = 1:1) and when all the starting material had been converted to a more polar compound, the suspension was filtered. The filtrate was evaporated under reduced pressure to give the title compound as a colourless crystalline solid (0.805 g., 80%). This material crystallised as colourless needles from ethyl acetate, m.p. 175° to 177°, $[\alpha]_D^{21}$ + 37° (c 1, tetrahydrofuran), $\nu_{max}$.(CHBr₃) 3420 and 3336 (NH), 1780 cm.⁻¹ (β-lactam), NMR (60 MHz., d₆-DMSO, τ) 1.74 (NH), 2.70 (C₆H₅), 4.58 (doublet; J = 4 Hz; H₁), 4.90 (1-proton multiplet; $J_{H,H}$ = 4 Hz, $J_{H,H}$ = 7Hz, $J_{H,H}$ = 1 Hz; H₅), 5.50 (1-proton multiplet; $J_{H,H}$ = 12 Hz, $J_{H,PhCH}$ = 6 Hz; H₃), 6.38 (double doublet; J = 12 Hz and 7 Hz; H₄), 6.62 and 6.98 (AB-part of ABX-system; $J_{PhCH}$ = 14 Hz, $J_{H,CH}$ = 6 Hz; PhCH₂) (Found: C, 60.2; H, 5.4; N, 13.0; S, 14.7. C₁₁H₁₂N₂OS requires: C, 60.0; H, 5.5; N, 12.7; 14.6%).

EXAMPLE 2

3-Benzyl-4-chlorocarbonyl-4,7-diaza-6-oxo-2-thia-1(R), 5(R)-bicyclo[3,2,0]-heptane A solution of triethylamine (1.4 ml. 10 mmole) in dry tetrahydrofuran at 0° was treated with a solution of phosgene in ether (29.4 ml., containing 1.0 g. $COCl_2$, 10.1 mmole). After one minute's stirring, the suspension was treated with a solution of 3-benzyl-4,7-diaza-6-oxo-2-thia-1(r), 5(R)-bicyclo[3,2,0]-heptane (1.0 g., 4.5 mmole) in dry tetrahydrofuran (10 ml.). After 5 minutes at room temperature, the suspension was filtered and the filtrate evaporated to give a crystalline solid. Ether (15 ml.) was added and the suspension filtered to give the carbamoyl chloride as a colourless prisms, m.p. 164° to 166° (decomp.), $[\alpha]_D$ - 436° (c 0.44, chloroform), $\nu_{max.}(CHBr_3)$ 3380 (NH), 1780 ($\beta$-lactam), and 1730 cm.$^{-1}$ (NCOCl), NMR (100 MHz, $CDCl_3$, $\tau$) 2.70 ($C_6H_5$), 3.45 (NH), 4.32 (1-proton multiplet, $H_3$), 4.63 (1-proton multiplet, $H_5$), 4.90 (doublet $J_{H,H}$ = 4.5 Hz, $H_1$), 6.62 (2-proton multiplet, $PhCH_2$) (Found: C, 50.7; H, 4.0; Cl, 12.4; N, 9.7; S, 11.1 $C_{12}H_{11}ClN_2O_2S$ requires: C, 51.0; H, 3.9; Cl, 12.5; N, 9.9; S, 11.3%).

EXAMPLE 3

4-t-Butoxycarbonyl-3ξ-benzyl-4,7-diaza-6-oxo-2-thia-1(R), 5(R)-bicyclo[3,2,0]-heptane A solution of 4-chlorocarbonyl-3ξ-benzyl-4,7-diaza-6-oxo-2-thia-1(R),5(R)-bicyclo[3,2,0]-heptane (600 mg., 2.12 mmole) in t-butanol (80 ml.) was refluxed with calcium carbonate (Calofort U) (1.6 g.) for 4 days. The reaction mixture was cooled and filtered, and the residue washed with benzene (15 ml.). The filtrate and benzene washings were evaporated in vacuo to leave a dark-brown gum. A solution of the gum in benzene (250 ml.) was washed with water (3 × 250 ml.) and evaporated in vacuo to an oil. The oil was chromatographed on a column of silica gel (75 g.) (Merck 0.05 to 0.2 mm), and the fractions eluted with ethyl acetate:benzene = 1:4 were evaporated to give 4-t-butyloxycarbonyl-3ξ-benzyl-4,7-diaza-6-oxo-2-thia-1(R), 5(R)-bicyclo[3,2,0]-heptane as a white powder (315 mg., 0.985 mole; 47%), which was recrystallized from chloroform: light petroleum (b.p. 40° to 60°) = 1:1 to give plates, m.p. 132° to 133° (dec.), $[\alpha]_D^{20}$ − 307° (c 0.38, chloroform), $\nu_{max.}$ (in bromoform) 3442 (NH), 3150 to 3600 ($H_2O$), 1782 ($\beta$-lactam 1706 cm.$^{-1}$ >$NCO_2R$), $\tau$ (100 MHz; $CDCl_3$ solution) 2.70 (5-proton singlet; phenyl protons), 3.70 (1-proton; $\beta$-lactam NH), 4.60 (1-proton quartet; X-part of ABX-pattern; $J_{AX}$ 8.5 Hz; $J_{BX}$ 3.0 Hz; $H_3$), 4.66 (1-proton doublet, J 5 Hz; $H_5$), 4.88 (1-proton doublet; J 5 Hz; $H_1$), 6.55 (2-proton octet; AB-part of ABX-pattern; $J_{AB}$ 13.3 Hz; $J_{AX}$ 8.5 Hz; $J_{BX}$ 3.0 Hz), 8.46 (9-proton singlet; $(CH_3)_3C$) (Found: C, 56.9; H, 5.7; N, 8.8; S, 9.8. $C_{16}H_{20}N_2O_3S.H_2O$ requires: C, 56.8; H, 6.3; N, 8.3; S, 9.6%).

EXAMPLE 4

(1R, 5R)-4,7-Diaza-3ε-methyl-6-oxo-2-thiabicyclo[3,2,0]-heptane

A solution of (1R,5R)-4,7-diaza-6-oxo-3-phenoxymethyl-2-thiabicyclo[3,2,0-hept-3-ene (3g., 0.013 mole) in purified tetrahydrofuran (160 ml) was stirred with amalgamated aluminium turnings (12 g.) for one hour, during which time water (1 ml.) was added. The mixture was filtered over kieselguhr, washed with excess tetrahydrofuran and the filtrate evaporated to an oil. The title compound was obtained as colourless prisms by trituration with ether (0.99g 53.3%), m.p. 148.5 to 150°, $[\alpha]_D^{21}$ −74.5° (c, 1, tetrahydrofuran), $\nu_{max. (CHBr3)}$ 3380 and 3308 (two NH) and 1760 cm$^{-1}$ ($\beta$-lactam), NMR (60 MHz, $CDCl_3$, $\tau$) 2.4 (NH), 4.52 (doublet, J 4.5 Hz, 1-H), 4.88 (multiplet, 5-H), 5.00 (multiplet, CH), 7.6 (NH), and 2.35 (doublet, $CH_3$). (Found: C, 42.3; H, 5.5; N, 19.6; S, 22.0; $C_5H_8N_2OS$ requires C, 42.0; H, 5.6; N, 19.5; S, 22.2%).

EXAMPLE 5

(1R,5R)-4-Chlorocarbonyl-4,7-diaza-3ε-methyl-6-oxo-2-thiabicyclo[3,2,0]-heptane.

A solution of (1R,5R)-4,7-diaza-3-methyl-6-oxo-2-thiabicyclo[3,2,0]-heptane (0.58 g., 4.03 mmole) in anhydrous tetrahydrofuran (116 ml) containing triethylamine (0.73 ml., 5.1 mmole) was treated for 1 min. at 21° with a solution of phosgene in anhydrous ether (10.8 ml.) [prepared from phosgene (6.9 g 0.07 mole) in anhydrous ether (134 ml.)]. Anhydrous ether (60 ml.) was then added and the precipitate removed by filtration. The filtrate was evaporated to a solid and on trituration with ether gave the title compound as white prisms (0.55g, 66.5%), m.p. 106° to 108°, $[\alpha]_D^{23}$ − 530° (c, 1, tetrahydrofuran), $\nu_{max}$ ($CHBr_3$) 3390 (NH), 1785 ($\beta$-lactam) and 1748 cm$^{-1}$. (COCl), NMR (60MHz, $CDCl_3$, $\tau$) 3.00 (NH), 4.10 (multiplet, 5 -H), 4.50 (doublet J 5Hz, 1-H), 4.74 (quartet, J 6 Hz, 3-H), and 8.18 (doublet, J 6 Hz, $CH_3$) (Found: C, 35.3; H, 3.6; Cl, 16.9; N, 13.9; S, 15.0; $C_6H_7ClN_2O_2S$ requires C, 35.0; H, 3.4; Cl 17.3; N, 13.6; S, 15.5%).

EXAMPLE 6

(1R,5R)-4,7-Diaza-3-methyl-6-oxo-4-t-butyloxycarbonyl-2-thiabicyclo[3,2,0]-heptane A solution of (1R,5R)-4-chlorocarbonyl-4,7-diaza-3-methyl-6-oxo-2-thiabicyclo[3,2,0]-heptane (0.4g., 1.94 mmoles) in anhydrous t-butanol (40 ml.) containing calcium carbonate (1.5 g. 15 mmoles) was heated at reflux for 48 hours. After filtration over kieselguhr and washing the filter pad with ethyl acetate, the filtrate was evaporated to a gum. This was then dissolved in dimethyl sulphoxide (1.5 ml) and allowed to stand at 22° for 3 hours. Partitioning between water and ethyl acetate (60 ml.), washing with water, drying, and evaporation of the organic layer resulted in a foam. Chromatography on silica gel (5g.) using benzene:ethyl acetate = 7:1 as solvent gave the title compound as white prisms (0.16 g, 34%), m.p. 107 to 108° $[\alpha]_D^{23}$ − 378° (c, 0.52, tetrahydrofuran), $\nu_{max}$ ($CHBr_3$) 3394 (NH), 1778 ($\beta$-lactam), and 1705 cm$^{-1}$ ($CO_2R$), NMR (60MHz, $CDCl_3$, $\tau$) 3.5 (NH), 4.22 (multiplet, J 4.5 Hz, 5-H), 4.64 (doublet, J 4.5 Hz, 1-H), 4.98 (quartet, J 6Hz, 3-H), 8.19 (doublet, J 6Hz, $CH_3$), and 8.52 ($C(CH_3)_3$). (Found: C,48.9; H, 6.5; N,11.9 S, 13.1; $C_{10}H_{16}N_2O_3S$ requires C, 49.2; H, 6.6; N, 11.5; S, 13.1%).

EXAMPLE 7

(1R, 5R)-3-Benzyl-4,7-diaza-7-[isopropenyl-(tetrahydropyran-2-yloxy)]methyl-6-oxo-2-thiabyclo[3,2,0]-heptane A solution of (1S,3S,5R,6R)-2,2-dimethyl-3-hydroxy-6-phenylacetamidopenam-1-oxide (2g., 6.2 mmole) in dry dihydropyran (30 ml.) was refluxed for 6 hours. The dihydropyran was the removed under reduced pressure to give a mixture of the tetrahydropyranyl ethers of the starting material as a yellow gum. A solution of this gum in ethyl acetate (30 ml.) containing trimethyl phosphite (1.3 ml, 11.0 mmole) and calcium carbonate (1 g.) was refluxed for 36 hours. The solid was filtered off and the solvent removed under reduced pressure. A solution of this gum in tetrahydrofuran (100 ml.) containing water (1 ml.) was stirred with amalgamated aluminium. Further quantities of water (1.0 ml.) were added at 30-minute intervals. The reaction was monitored by thin-layer chromatography (benzene:ethyl acetate = 1:1) and when all the starting material had been converted to a more polar compound, the suspension was filtered and the filtrate evaporated to give a yellow gum. A solution of gum in dry tetrahydrofuran (20 ml.) was treated with a solution of hydrogen chloride in ether. The white solid that separated was filtered off. A suspension of this solid in ethyl acetate was washed with aqueous sodium hydrogen carbonate. The organic layer was separated and reduced to dryness. A solution of the residue in ether deposited the title compound as colourless prisms (600 mg., 26%), m.p. 145° to 149°, $[\alpha]_D - 279°$, (c,1, tetrahydrofuran), $\nu_{max}$ (CHBr$_3$) 3360 (NH) and 1760 cm$^{-1}$ ($\beta$-lactam), NMR (CDCl$_3$/D$_2$O, $\tau$) 2.72 (Ph), 4.61 and 4.95 (AB-quartet, J 4.5 Hz, 1-H and 5-H), 5.37 (1-proton multiplet, 3-H), 4.57 and 4.64 (=CH$_2$), 5.01 and 5.36

and

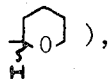

6.30 and Ca. 8.4

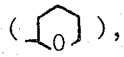

6.76 (2-proton multiplet, PhCH$_2$), 8.21 (CH$_3$).

EXAMPLE 8

(1R,5R)-$\alpha$-Isopropenyl-$\alpha$[3-Benzyl-4,7-diaza-6-oxo-2-thiabicyclo[3,2,0]-hept-7-yl]acetic acid 2',2',2'-Trichloroethyl (1R,5R)-$\alpha$-isopropenyl-$\alpha$-[3-benzyl-4,7-diaza-6-oxo-2-thiabicyclo[3,2,0]-hept-3-en-7-yl]-acetate (1.4g, 0.0031 mole) was stirred with zinc dust (2g) in formic acid (30ml.) at 19° for 3 hours. The zinc dust was removed by filtration and the formic acid solution evaporated to dryness. The residue was partitioned between ethyl acetate and aqueous sodium hydrogen carbonate solution. After washing with ethyl acetate, the aqueous layer was acidified with formic acid and extracted with ethyl acetate. The ethyl acetate was evaporated to give the title compound (0.77 g,78%), m.p. 134° to 137° (decomp), $[\alpha]_D{}^{20} - 200°$ (c,1.00, dioxan), $\nu_{max}$ (CHBr$_3$) 3510 (COOH monomer), 3350 (NH), 2,600 (COOH-dimer), 1750 ($\beta$-lactam), 1720 (COOH monomer), 1690 (COOH dimer), and 910 cm$^{-1}$ (=CH$_2$); $\tau$ (CDCl$_3$ with 2 drops DMSO) 2.71 (singlet; phenyl protons), 3.00 (broad signal; NH and COOH), 4.24 (doublet, J 4 Hz; 5-H), 4.90 (obscured doublets; 1-H), 4.92 (singlet; =CH$_2$), 5.29 (multiplet; 3-H), 5.34 (singlet; >CHCOOH), 6.23 (singlet; —CH$_2$Ph), and 8.15 (singlet; CH$_3$). (Found: C, 58.6; H, 5.8; N, 8.5, S, 9.5. C$_{16}$H$_{18}$N$_2$O$_3$S. 0.5H$_2$O (327) requires C, 58.6; H, 5.8; N, 8.6; S 9.8%).

EXAMPLE 9

2',2', 2'-Trichloroethyl-(1R,5R)-$\alpha$-ispropylidene-$\alpha$[3-benzyl-4,7-diaza-6-oxo-2-thiabicyclo [3,2,0]-hept-7-yl]acetate 2',2',2'-Trichloroethyl-(1R,5R)-$\alpha$-isopropylidene-$\alpha$-[3-benzyl-4,7-diaza-6-oxo-2-thiabicyclo [3,2,0]-3-en-7-yl] acetate (1.13g, 0.0025 mole) was stirred with aluminium amalgam [prepared from aluminium powder (1g)] in tetrahydrofuran (70 ml.) with additions of water (0.1 ml) every 30 minutes. After 4 hours, the amalgam was separated by filtration, washed with tetrahydrofuran, and evaporated. The residue (1.1g), was chromatographed on silica gel, with elution with 25% ethyl acetate in petroleum ether (b.p. 40° to 60°) to give the title compound (0.13g,12%) [starting material (0.74g, 66%) was recovered], m.p. 118° to 121°, $\nu_{max}$ (CHBr$_3$) 3350 (NH), 1760 ($\beta$-lactam), and 1740 cm$^{-1}$ (unsaturated ester), $\tau$ (CDCl$_3$) 2.71 (singlet; phenyl protons), 4.12 (doublet, J 4 Hz; 5-H), 4.81 (doublet, J4 Hz; 1-H), 5.04 and 5.41 (AB-quartet, J 12 Hz; -CH$_2$CCl$_3$), 5.25 (multiplet; 3-H), 6.55 and 6.87 (AB-part of an ABX-system, J$_{AB}$ 14 Hz; J$_{AX}$ 5 Hz., J$_{BX}$ 6 Hz.; -CH$_2$Ph), and 7.73 and 8.02 (CH$_3$).

EXAMPLE 10

(1R,5R)-3-Benzyl-4,7-diaza-6-oxo-2-thia-4-(2',2',2'-trichloroethoxycarbonyl)bicyclo[3,2,0]-heptane.

A solution of (1R,5R)-3-benzyl-4,7-diaza-6-oxo-2-thiabicyclo[3,2,0]-heptane (0.5 g., 2.38 mmole) in N,N-dimethylacetamide (12.5 ml) and methyl cyanide (5 ml) was treated with 2,2,2-trichloroethyl chloroformate (0.5 ml. 3.9 mmole) at 20° for 1 hour. This was followed by a further addition of 2,2,2-trichloroethyl chloroformate (0.5 ml, 3.9 mmole) and the reaction was continued for another hour. After pouring into excess saturated sodium hydrogen carbonate solution and extraction with ethyl acetate (50 ml.), the organic phase was washed with water, dried, and evaporated to a gum. Trituration with ether gave the title compound as a colourless crystalline solid (0.43 g., 49%), m.p. 161° to 162°, $[\alpha]_D{}^{21} - 243°$ (c, 0.1, tetrahydrofuran), $\nu_{max}$ (CHBr$_3$) 3440 (NH), 1790 ($\beta$-lactam), 1730 (CO$_2$R), and 746 cm$^{-1}$ (phenyl), NMR (CDCl$_3$, $\tau$) 2.70 (phenyl), 3.44 (NH), 4.50 and 4.52 (multiplet 5-H and 3-H), 4.84 (1-H, doublet, J 5 Hz), 5.04 and 5.25 (AB-quartet, J 13 Hz, -CH$_2$CCl$_3$), 6.24 and 6.78 (2-proton multiplet, J 2 and 9 Hz) (Found: C, 42.3; H, 3.2; Cl, 26.9; N, 7.3; S, 8.3. C$_{14}$H$_{13}$Cl$_3$N$_2$O$_3$S requires: C, 42.5; H, 3.3; Cl, 26.8; N, 7.1; S, 8.1%).

EXAMPLE 11

(1R,5R)-3-Benzyl-4-benzyloxycarbonyl-4,7-diaza-6-oxo2-thiabicyclo[3,2,0]-heptane A solution of (1R,5R)-3-benzyl-4,7-diaza-6-oxo-2-thiabicyclo[3,2,0]-heptane (0.5 g., 2.3 mmole) in anhydrous pyridine (5 ml) at 0° was treated with benzyloxycarbonyl chloride (5ml.). After two hours the mixture was poured into excess 2N-hydrochloric acid and extracted with ethyl acetate (30 ml.). Washing with water, drying, and evaporation gave an oil. This was chromatographed on silica gel (7.5 g), with benzene followed by benzene:ethyl acetate = 4:1 as solvents. The title compound was isolated as a white crystalline solid (0.1 g., 12.5%), m.p. 118° to 121°, $\nu_{max}$ (CHBr$_3$) 3415 (NH), 1780 ($\beta$-lactam), 1710 (CO$_2$R), and 749 cm$^{-1}$ (Ph), NMR (CDCl$_3$, $\tau$) 2.4 to 2.9 (multiplet, Ph), 3.74 (NH), 4.58 (multiplet, 3-H and 5-H), 4.78 (—OCH$_2$Ph), 4.91 (doublet J 5 Hz, 1-H), 6.30 and 6.83 (multiplet, —CH$_2$Ph).

EXAMPLE 12

Diethyl 2-( 1'R, 5'R)-(3'-Benzyl-4',7'-diaza-6'-oxo-2'-thiabicyclo [3,2,0]-hept-7'-yl)malonate Diethyl 2-(1'R,5'R)-(3'-benzyl-4',7'-diaza-6'-oxo-2'-thiabicyclo [3,2,0]-hept-3'-en-7'-yl) malonate (0.5 g, 0.0014 moles) was stirred with amalgamated aluminium [prepared from powdered aluminium (2g)] in tetrahydrofuran (20 ml.) containing water (0.4 ml.) at 28° for 1.5 hours. The suspension was filtered and the filtrate, after concentration, was chromatographed on silica gel (30g) in methylend chloride-acetone mixtures (98:2 to 90:10) to give the title compound (0.37 g., 74%) as a gum, $\nu_{max}$ (CHBr$_3$) 3312 (NH), 1770 ($\beta$-lactam), and 1746 cm$^{-1}$ (ester), $\tau$ (CDCl$_3$) 2.73 (singlet; phenyl protons), 4.11 and 4.81 (2 doublets, J 4 Hz; $\beta$-lactam protons), 5.00 (singlet; —CH (COOEt)$_2$), 5.2 to 5.4 (X-part of ABX-system, Ph-CH$_2$-CH), 5.75 (quartet, J 7 Hz; -CH$_2$CH$_3$), 6.4 to 7.0 (AB-part of ABX-system, Ph-CH$_2$-), 7.55 (broad singlet; N-4 H), and 8.72 and 8.79 (2 triplets, J 7 Hz; CH$_2$CH$_3$).

The starting materials used in Examples 1, 4, 8 and 9 above may be prepared as described in Examples 1(c), 4, 1(a) and 1(b) respectively of the copending application of Barton, Long, Looker, Wilson and Underwood, Ser. No. 167,876, filed July 30, 1971. The starting material of Example 7 may be prepared according to Example 2 of the copending application of Underwood and Hewitt, Ser. No. 167,847, filed July 30, 1971 and that of Example 12 according to Example 4 (Compound F) of the copending application of Barton, Underwood, Looker and Hewitt, Ser. No. 167,849, filed July 30, 1971.

We claim:

1. A compound selected from the group consisting of those of the general formula:

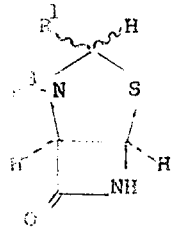

wherein:

R$^1$ is the residue of the group R$^1$CO, wherein R$^1$CO is R$^u$C$_n$H$_{2n}$CO-, where R$^u$ is phenyl, fluorophenyl, nitrophenyl, aminophenyl, acetoxyphenyl, methoxyphenyl, methylphenyl, hydroxyphenyl, N,N-bis(2-chloroethyl)aminophenyl, thien-2-yl, thien-3-yl, isoxazol-4-yl, pyridyl, tetrazolyl, 3-phenyl-5-methyl isoxazol-4-yl, or 3-chlorophenyl or 3-bromophenyl-5-methyl isoxazol-4-yl, and n is an integer from 1-4; and R$^3$ is hydrogen; a hydrocarbyloxycarbonyl group selected from the group consisting of methoxycarbonyl, ethoxycarbonyl, t-butoxycarbonyl, 2,2,2-trichloroethoxycarbonyl, benzyloxycarbonyl, p-methoxybenzyloxycarbonyl, diphenylmethoxycarbonyl, adamantyloxycarbonyl, and p-nitrobenzyloxycarbonyl; an o or p-nitrophenylsulphenyl group; or a diphenylmethyl or triphenylmethyl group; and when R$^3$ is hydrogen the acid addition salts thereof.

2. The compound of claim 1 wherein:
R$^1$ is benzyl; and
R$^3$ is hydrogen, t-butoxycarbonyl, 2,2,2-trichloroethoxycarbonyl, or benzyloxycarbonyl.

3. The compound of claim 2 which is 3-Benzyl-4,7-diaza-6-oxo-2-thia-1(R), 5(R)-bicyclo[3,2,0]-heptane.

4. The compound of claim 2 which is 4-t-Butoxycarbonyl-3-benzyl-4,7-diaza-6-oxo-2-thia-1(R),5(R)-bicyclo [3,2,0]-heptane.

5. 3-Benzyl-4-chlorocarbonyl-4,7-diaza-6-oxo-2-thia-1(R),5(R)-bicyclo[3,2,0]-heptane.

6. 3-Methyl-4,7-diaza-6-oxo-2-thia-1(R),5(R)-bicyclo [3,2,0]-heptane.

7. 3-Methyl-4-chlorocarbonyl-4,7-diaza-6-oxo-2-thia-1(R), 5(R)-bicyclo[3,2,0]-heptane.

* * * * *